UNITED STATES PATENT OFFICE 2,587,581

AZIDE MODIFIED FUELS AND LUBRICANTS

Sol Shappirio, Washington, D. C.

No Drawing. Application May 10, 1948,
Serial No. 26,237

15 Claims. (Cl. 252—47.5)

This invention relates to hydrocarbon distillates including such distillates lighter than kerosene, particularly in the range of motor fuels and lubricants, which distillates contain azide constituents to modify their characteristics desirably, for fuel or lubricant purposes including such fuel or lubricant modifying components which serve such purposes as antioxidants, anti-knock components, anti-gum agents, etc.

Particular objects of the present invention include the production of such modified distillates containing azide components, and more particularly when produced in situ in the distillates, desirably form components at least one of which is present or formed in the distillate, whether fuel or lubricant, from constituents present in such fuel or lubricant as formed by normal processes under which such distillates are produced.

Other objects and advantages will appear from the more detailed description set forth below, it being understood, however, that this more detailed description is given by way of illustration and explanation only, and not by way of limitation, since modifications therein may be made by those skilled in the art without departing from the scope and spirit of the present invention.

The present invention is concerned with liquid petroleum distillates such as motor fuels, diesel fuels, lubricants, etc., which contain azides by which the sulphazides will be illustrative at this point. The sulphazides generally may be formulated as having the formula

where R and R' are desirably alkyl or aryl radicals either susbtituted or unsubstituted. Individual azides may be utilized or mixtures of different azides may be employed, such mixtures including mixtures of azides containing aryl groups only or mixtures of azides containing alkyl groups only or mixtures of azides containing both aryl and alkyl groups in the same molecule. As alkyl groups there may be methyl, ethyl, propyl, isopropyl, butyl, isobutyl, trimethyl methyl, the various pentyl and higher alkyl groups. As aryl groups there may be phenyl, tolyl, xylyl, naphthyl groups, and where oil-solubility is desirable, such oil-solubility may be enhanced in the aryl derivatives by having substituent aliphatic chain groups attached to the aryl nucleus which chains contain at least 3 carbon atoms. The mixed alkyl-aryl azides may be selected from the groups set forth above and similar groups.

The sulphazides may be produced in any desired way and examples of their production will be set forth below. They may be simply formulated by reaction of diazo salts or diazonium halides for example, with sulfur dioxide in the presence of water, alcohols such as ethyl alcohol, and other liquid aliphatic and aromatic solvents. Thus the diazo salt or diazonium halide or sulfate may be treated in an aqueous solution in which it is normally produced by addition of a solution of sulfur dioxide in water, the reaction being carried out at temperatures around 20° C. or more, desirably lower temperatures produced by cooling as around 5° C. and in any event, the temperatures in the initial phases of the reaction should be below that of decomposition of the diazo salt or diazonium halide or sulfate, etc., employed. Instead of treating such diazo salt or diazonium salt with an aqueous solution of sulfur dioxide, a solution of sulfur dioxide in other organic liquids such as alcohol may be used. Or the sulfur dioxide may be bubbled through a solution of diazo salt, as for example, the aqueous solution of the diazo salt. Where the diazo salts are produced in situ as set forth below from constituents of the petroleum distillate itself, or in any case where a petroleum distillate contains such diazo salt added thereto as well as in those cases where it is produced in situ, the treatment with sulfur dioxide may be carried out by agitating the hydrocarbon fraction containing the diazo compound with an aqueous solution of sulfur dioxide and separation of the water layer will remove the acid present. As exemplary of the reactions which take place in the production of such sulphazides the following is given:

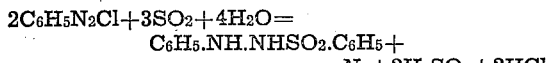

As an example of producing such a sulphazide in situ, the following is given:

I 1400 parts of weight of a hydrocarbon fraction containing 1% of phenyl diazonium chloride is agitated with an aqueous solution of sulfur dioxide in amount to supply 7 parts by weight of sulfur dioxide. The reaction product is neutralized as by agitation with sodium carbonate or other alkaline substance, and the aqueous layer decanted to give a hydrocarbon fraction containing about 1% of the phenyl sulphazide. The reaction is desirably carried out at temperatures below those of decomposition of the diazonium chloride used. With phenyl diazonium chloride, the temperature is desirably below 20° C. and may be kept around 5° C. by cooling, at least in the early stages.

With other diazonium salts which are stable at higher temperatures, elevated temperatures may be used, and refluxing may be employed in some cases.

Other aryl sulphazides may be prepared by a similar reaction. Thus tolyl, xylyl, naphthyl, etc., sulphazides may be prepared substituting equivalent amounts of the corresponding diazonium salt for the phenyl diazonium halide. The sulphazides may be prepared externally of the hydrocarbon fraction and added thereto in the desired amounts, as for example, from 0.05 to 5% by weight of the distillate. More desirably they are prepared in situ in the hydrocarbon fraction from diazonium salts produced therein in situ from components of the hydrocarbon fraction as explained below. In such cases, complex mixtures of sulphazides are formed in situ, and may even include aliphatic derivatives and mixed aliphatic, aromatic derivatives.

Desirably one aryl group present in the sulphazide should contain a substituent alkyl group of at least three carbon atoms to enhance oil-solubility. Such aryl groups may be n-propylphenyl, isopropylphenyl, n-butylphenyl, isobutylphenyl, trimethyl methylphenyl, etc. Where the azides are produced in situ and mixed azides are formed, they will flux each other and produce sufficient solubility without requiring the introduction of specific groups for that purpose. But even suspensions of the azides may be employed in the petroleum distillates in view of the small quantities in which they need be employed.

The diazo salts in the petroleum distillate may be treated with sulfur dioxide and water in amount to convert only a portion of the salts into sulphazides thus producing distillates containing mixtures of diazo salts and sulphazides, which may be used as such. Or if desired, the diazo salts in such mixtures may be converted in whole or in part to derivatives other than sulphazides by the reactions hereinafter set forth. As exemplary of the production of mixed sulphazides and unreacted diazo salts, the following example is given:

II 1400 parts by weight of a hydrocarbon fraction containing 1% of mixed diazonium halides produced in situ by methods hereinafter set forth, is agitated with an aqueous solution of sulfur dioxide in amount to supply 3.5 parts by weight of sulfur dioxide. The reaction product is neutralized as set forth above in Example I by agitation with sodium carbonate or other alkaline substance which does not affect the azides present, and the aqueous layer decanted to give a hydrocarbon fraction containing approximately 0.5% of phenyl sulphazide and 0.2% of diazo salts. The presence of these diazo salts is important in modifying the action of the sulphazides but more importantly also for conversion of the diazo salts into other derivatives of various types as hereinafter set forth which may be present with the sulphazides in the same compositions. Only a portion of the diazo salts present in the fractions containing sulphazides and diazo salts need be converted into the other derivatives so that some residue of diazo salts remains in the compositions and complex mixtures are thus produced.

Sulphazides have been particularly emphasized above to illustrate the invention but other types of azides produced by using any of the oxides of sulfur in lieu of sulfur dioxide and any of the oxides and sulfides of phosphorus in lieu of sulfur dioxide in the examples given, may be employed to produce complex derivatives. These may be generally formulated when of the azide type as $R.NH.NH.(Q_xT_y)R'$, where $R$ and $R'$ are selected from the group consisting of alkyl and aryl radicals, and $Q_xT_y$ represents a residue selected from the group consisting of oxides of sulfur, and oxides and sulfides of phosphorus. The oxides of sulfur which are employed in producing such reaction products with the diazo salts or diazonium halides, sulfates, etc., include beside sulfur dioxide referred to above, sulfur trioxide, the oxides of phosphorus include the various such oxides including phosphorus trioxide $P_2O_3$, phosphorus tetroxide $P_2O_4$, phosphorus pentoxide $P_2O_5$, and the various sulfides of phosphorus include the trisulfide $P_2S_3$, the pentasulfide $P_2S_5$, the sesquisulfide $P_4S_3$, the heptasulfide $P_4S_7$, etc. Equivalent amounts of any of these oxides of sulfur or oxides or sulfides of phosphorus may be substituted for the sulfur dioxide in the examples given above to produce complex derivatives which include compounds as formulated above containing residues of such oxides of sulfur or oxides or sulfides of phosphorus and also other complex derivatives. Where the oxides of phosphorus are employed, they may more desirably be used to treat the diazonium halides or other diazo salts in the absence of water using either the hydrocarbon fraction as the diluent in which the reaction is carried out, or the reaction may be carried out in alcohol or other organic liquid solvents and the resulting reaction mixture subsequently treated with water or not as desired to modify the reaction products obtained. Where solid oxides or sulfides of sulfur or phosphorus are employed in the reaction, they may be utilized in the reaction by being added in small fractions to the diazo salts either in the presence or the absence of a diluent, and when water together with such oxides or sulfides of sulfur or phosphorus are employed, both reactants may be added portionwise with agitation to the diazo salts either as such or in solution in water, alcohol, a hydrocarbon fraction, etc., as for example, a petroleum distillate itself which serves as the vehicle for the production of these materials in situ.

While the term "sulfazide" is used above to cover compounds containing the group $-NH.NH.SO_2-$ in keeping with commonly accepted nomenclature, the term is really inappropriate since the compound is a sulfonic hydrazide.

Sulfinic hydrazides may also be prepared and utilized in lieu of, or in addition to the sulphazides. Such sulfinic hydrazides may be generally formulated as

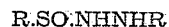
R.SO.NHNHR where R has the meaning set forth below for substitutent groups in the phospho compounds. In both the sulfonic and sulfinic derivatives, the oxygen may be replaced by sulfur giving thio-derivatives such as

R.SOS.NHNHR
RS₃NHNHR
RS₂NHNHR

These sulfinic derivatives may be readily prepared by reaction of a sulfino chloride with a hydrazine, as for example, phenyl sulfinic acid chloride reacted with phenyl hydrazine under conditions as set forth below in Example III.

The corresponding phosphorus containing compounds are more appropriately denominated phosphinic acid or phosphonic acid hydrazides. Compounds of this character produced by reaction of diazonium salts with oxides of phosphorus as set forth above include compounds having the general formula

R.PO.OH.(NH.NHR)
R.PO.(NH.NHR)₂ as exemplified by phenyl phosphinic acid-bis phenyl hydrazide C₆H₅.PO.(NH.NH.C₆H₅)₂ produced by reaction of phenyl diazonium chloride with phosphorus pentoxide.

Corresponding thio derivatives are:

R.PS.OH.(NH.NHR)
R.PO.SH.(NH.NHR)
R.PS.SH(NH.NHR)
R.PS.(NHNHR)₂ obtainable by reaction of the diazo salts with the stated sulfides of phosphorus to product thio derivatives alone, or by reaction with mixtures of oxides and sulfides of phosphorus to produce sulfur and oxygen containing derivatives.

Where lower oxides and sulfides are used, hydrazides are obtained having the formulas indicated below depending on whether oxides or sulfides of phosphorus are used for reaction or mixtures of them:

R.P.OH.(NH.NHR)
R.P.(NH.NHR)₂
R.P.SH.(NH.NHR)

In the above formulations R is aryl such as phenyl, tolyl, xylyl, naphthyl, etc., or substituted aryl groups and both R substituents may be the same or different groups. The aryl derivatives are usually formed by the in situ production of the stated compounds from diazo salts produced in situ from constituents of the hydrocarbon fraction as described herein. They may be produced externally of the motor fuels or lubricants and added thereto in amounts of the order of 0.05 to 5% although higher amounts may be employed.

When produced externally of the hydrocarbon fraction, the substituent groups R may be aryl, as above, or alkyl such as methyl, ethyl, etc., as set forth for other substituent alkyl groups herein, or cyclo-non-aromatic such as cyclohexyl, cyclopentyl, cycloheptyl, cyclooctyl, etc.

In the complex reactions which take place in situ in the hydrocarbon fraction there is also some production of phosphonic hydrazides having the formulas set forth below depending on whether oxides or sulfides of phosphorus are used in the reaction or mixtures of them:

RO.P.OH.NHNHR
RS.P.OH.NHNHR
RO.P.SH.NHNHR
RS.P.SH.NHNHR
RO.P(NH.NHR)₂
RS.P(NH.NHR)₂ where R has the values set forth above. Or the phosphonic hydrazides may be separately prepared externally of the motor fuel or lubricant and added thereto including alkyl, aryl, and cyclo-non-aromatic or mixed derivatives, i. e., alkyl-aryl, alkyl-cyclo-non-aromatic, aryl-cyclo-non-aromatic, alkyl-aryl-cyclo-non-aromatic.

In any of the derivatives where an OH or SH group is attached to P or S, such compounds may be converted to metal salts replacing the H by metal particularly one of the anti-knock metals herein described. Or the OH and SH groups may be etherified with a hydrocarbon radical as set forth herein or acylated or esterified with an acyl group or an inorganic acid.

In the hydrazo portion of the molecule, the hydrogens attached to nitrogen may be replaced in whole or in part by hydrocarbon or substituted hydrocarbon groups such as alkyl, aryl, cyclo-non-aromatic as specifically exemplified above.

Mixtures of sulfonic, sulfinic, phosphonic, and phosphinic compounds in any combination may be prepared either externally of the hydrocarbon fraction and added thereto, or in situ as explained herein. Thus the use of sulfur dioxide and phosphorus pentoxide will give both types of derivatives. Further, the different acid groups may be attached to a single hydrazine nucleus to give mixed derivatives as in compounds generally formulated as

R.PO.NH.NH.SO₂.R where R is a substituent group as set forth above. Such derivatives may be readily prepared by the methods set forth herein.

The following examples will illustrate the formation of acid hydrazides and their metal derivatives.

III

Dissolve 4 gram-moles of phenyl hydrazine in anhydrous ethyl ether and add slowly thereto 1 gram-mole of phenyl phosphinic acid chloride. Reaction takes places rapidly forming phenyl phosphinic acid-bis phenyl hydrazide. This may be purified by extraction with hot alcohol or chloroform and the latter solvent removed from the hydrazide. The purified material may be added to the motor fuel or other fraction in amounts as indicated above, or the reaction mixture without purification may be added to the hydrocarbon fraction.

IV

To the reaction mixture containing the phenyl phosphinic acid-bis phenyl hydrazide as produced in Example III above, add a water solution of 1 gram-mole of lead acetate and agitate at room temperature, and after ½ hour warm slightly to 30° C. The water layer is separated, and the remaining product washed with water. It may be dried over calcium chloride and then added to the hydrocarbon fraction in amounts of the order of 0.5 to 5% by weight.

Other metal salts particularly of the anti-knock metals herein set forth may be prepared in a similar manner or mixed metal derivatives may be used. Such metal derivatives used in conjunction with lead alkyls in fuels or lubricants exhibit a synergistic action.

The acid hydrazides of the present invention, used in hydrocarbon motor fuels, diesel fuels, and lubricants are particularly valuable in giving compounds containing phosphorus and sulfur in nitrogen derivatives which while giving valuable effects, are non-corrosive to special bearing and other alloys commonly used today in internal combustion engines.

Since the invention particularly includes the production of the azides in liquid petroleum distillates in situ and most desirably from components of the distillate itself producing indigenous products, the following material is particularly explanatory of the various operations that may be employed in this connection. Thus there may be utilized the preparation of metallo organic and other derivatives directly in the fuel or analogous material, and preferably from constituents of the fuel or analogous material itself without the addition of extraneous hydrocarbon sources is particularly emphasized, the oils of hydrocarbon character or their derivatives or fractions or distillates being converted into compounds in part, or to a limited extent, which upon further treatment are readily converted into the metallo organo and other derivatives. In addition, extraneous substances, either for the purpose of forming the metallo organic substances within the fuel, or as a partial source for such metallo organic and other substances, some of the latter also being derived from the fuel or analogous material, may also be added to the gasoline or other material treated.

The hydrocarbon materials treated may be the hydrocarbon oils, their fractions and distillates including the gasolines, produced by various processes and other hydrocarbon products that have fuel value. Such gasolines, for example, may be those from straight distillation processes, from cracking processes either in the presence or absence of air, from natural gas, etc. As pointed out, where the metallo organo derivatives are to be produced of the alkyl type, it is desirable to have present in the gasolines or other hydrocarbon product, lower members of the paraffin series, and consequently gasolines containing such lower paraffins, such as ethane, propane and butane are particularly desirable, but the gasolines containing aromatics also are readily converted into the desired metallo organic compounds. Gasolines and related materials produced during cracking or analogous heat and pressure treatment in the presence of air are highly advantageous, and more particularly when in such processes the gasolines produced contain even a small amount of oxygen-containing substances, such as the ethers, since such oxygen-containing substances often act catalytically in the processes of converting some of the described intermediate substances into metallo organic compounds. The presence of such oxygen-containing compounds as the aldehydes, ketones, etc. are desirable for other purposes set forth below. Diesel fuels are, of course, included.

If certain desired lower members of the paraffin series are not already present in the gasoline or other material to be treated, they may be added to the same; and, of course, the same applies to other constituents that may be desired in the final products. Instead of converting the constituents of the gasoline or analogous material directly into the intermediate that is to be converted into the metallo compounds, there may be added to the gasoline or similar material, a substance which will be converted into the metallo compound desired, the gasoline remaining substantially as it was before the conversion and the metallo compounds being derived solely from the added substances, or any combination of these steps may be utilized.

Among the metals and non-metals that may be introduced into gasoline by the processes there set forth, there may be mentioned lead, tin, silicon, antimony, arsenic, phosphorus, mercury, thallium, etc. Lead compounds are particularly used for illustrative purposes therein in view of the wide use of lead compounds. For certain purposes such as metallized dyes, other metals such as copper, chromium, zinc, etc., may be utilized.

In the preparation of the metallo organic compounds in the fuel or analogous material, the metallo organic compounds do not have to be separately handled. The production of such metallo organic compounds in the fuel and from fuel constituents may be carried out so that the fuel is present in a more limited quantity whereby a concentrated metallo organic containing product is obtained which may be secured by distilling off the hydrocarbon products present, or which may subsequently be diluted with more fuel or gasoline or related substance to the concentration desired, or the metallo organic substance or substances may be prepared in the gasoline or analogous material in a very dilute condition, so that further dilution is unnecessary, and the special fuel is directly produced without more. The preparation of the desired ingredients in very dilute condition is particularly desirable where some of the constituents thus produced are not very soluble in the motor fuels, although the very small quantities of such materials present needed for anti-knock, antioxidant, anti-gum, or dye purposes, etc., do not require absolute solution, although in such dilutions in which they are used, they are readily obtainable in solution form, or if necessary blending agents may be utilized to produce the requisite solubility.

In many of the reactions of making metallo organic derivatives, the presence of catalysts have been found to be highly desirable, such catalysts particularly referred to as Grignard catalysts are particularly referred to, including for example, primary, secondary, tertiary amines, and their alkyl addition products, such amines being aliphatic, aromatic or heterocyclic derivatives. Examples are aniline, dimethylaniline, carbazol, phenyl hydrazine, quinoline, etc. Other desirable catalysts or agents that may be present include ether, ethers in general, ammonia and its derivatives, esters. These compounds may exist in the gasoline or other material undergoing treatment, so the addition of such catalysts is not specifically necessary. And this is particularly true in connection with the gasolines produced by oxidation processes, including both those of the vapor and liquid phase oxidation reactions. Other compounds, like the amines, etc., etc., referred to above may be present in the gasoline by various methods, as indicated below, wherein they may be produced from constituents of the gasolines themselves, or may be introduced from external sources. The catalyst added may be selected from the named substances or other derivatives, particularly with regard to their value in fuel compositions, for example, the simpler ethers, and the amines, particularly the aromatic series thus being indicated.

The metallo organo derivatives may be produced in various ways, as for example, by methods set forth in Patents Nos. 2,012,356, 2,134,625, and 2,272,134, of which the instant specification is a continuation-in-part.

While in the production of Grignard reagents monohalogen derivatives are particularly emphasized, where the halogen derivatives are converted into amines or other derivatives, higher halogen derivatives are desirable leading to the production of diamines, etc., which diamines, particularly the aromatic diamines, like paraphenylenediamine, are particularly valuable as in the production of dyes, etc.

The Grignard catalysts such as the aromatic amines, like aniline and dimethylaniline, carbazol, etc., the aliphatic amines, like phenyl hydrazine, and the heterocyclic derivatives, like quinoline, will also be present in the motor fuels, except as they may in part be altered by the reactions to which the fuel fractions are subjected, and to the extent that they are present are desirable ingredients as anti-gum agents, etc.

Instead of producing Grignard reagents directly as set forth above, the Barbier modification may be employed in which the magnesium is suspended in a hydrocarbon fraction either with or without diethyl ether or other Grignard type solvent and the hydrocarbon halide is added to such suspension while agitating and maintaining the proper temperature conditions. In some instances depending on the nature of the materials being reacted, and the heat of reaction, cooling may be employed. But in general the reactants may be reacted under conditions in which refluxing of components of the hydrocarbon fraction or of the diethyl ether or other solvent may take place.

While a number of metal derivatives may thus be introduced into the distillate by being made directly therein, if desired after the production of one metallo organic compound, it may be converted partially or wholly into other metallo compounds. And furthermore, if desired, instead of the Grignard intermediates produced as set forth above, or added to the distillate— for example, the Grignard reagents might be prepared in the usual manner and then added to the gasoline or other distillate—the latter may be converted into other derivatives than the metallo derivatives. The Grignards are well known as excellent intermediates for the synthesis of a number of organic compounds. So that they may be used as set forth in the prior description to form a large number of organic compounds that have value in distillates. For example, by appropriate treatments, they may be converted into alcohols, phenols, aldehydes, ketones, etc. And these reactions may be utilized so that a portion of the Grignard reagents are converted into the metallo derivatives and a portion into other organic compounds.

And further, many of the products may be made in the fuel from the halides by taking crude hydrocarbon materials that must be subjected to distillation or other treatment, or treatments, in order to obtain motor fuels from them, by adding the requisite materials to them to form the metallo compounds, or converting a portion of such crude materials into compounds that will form metallo derivatives, and then carrying out the distillation or other treatments, so that a gasoline or analogous material or fuel is obtained containing the metallo organic compounds that have been formed during the distillation or other treatment, which may or may not have been carried out under pressure.

Thus the introduction of the halogen to the material undergoing distillation will yield halogenated fractions, as for example, halogenated motor fuel fractions which may accordingly be treated as set forth above. Or the introduction of halogen followed by contact of the halogenated product with the sodium lead alloy, for example, before distillation, or at various stages thereof, will result in fractions such as motor fuels produced with the metallo derivatives in the fuel during the distillation.

The Grignard reagents, as indicated above, are utilizable however in many other directions for the production of both metallo derivatives other than those of the alkyl and aryl types strictly, and also for the production of many valuable ingredients in motor fuels and lubricants which do not necessarily contain any metallo component.

The metallo aryl Grignard reagents may also be desirably employed in the production of azo compounds, for example, benzene magnesium iodide yielding with benzene diazonium chloride, azo benzene in accordance with the following reaction.

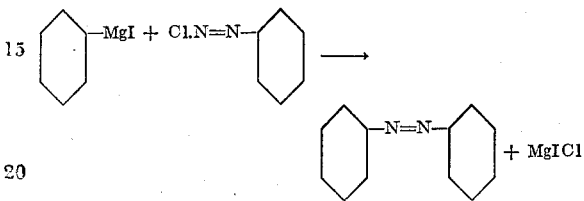

Such azo compounds are desirable components in motor fuels, and these types of reactions of which that illustrated is merely exemplary may be utilized in the production of azo dyes in the motor fuels from constituents thereof, as more fully explained below. In this connection it may be pointed out that the Grignard reagents are easily produced in the motor fuel from the constituents thereof as set forth above, and the diazo compounds may also be produced herein both by methods explained above and by subsequent methods, and such constituents produced in the motor fuel then permitted to react to produce the azo compounds. Substituted azo compounds of the true dye type may thus be produced in the motor fuel, and in view of their production in complex mixtures in such motor fuel from derivatives thereof, dyes can be produced in the motor fuel that remain in solution therein, which is difficult in the production of many types of dyes by extraneous reactions, followed by their incorporation into motor fuels. Entirely new varieties of dyes in complex mixtures are thus producible in the motor fuel from constituents in this way. The Grignard reagents may be produced from the motor fuels themselves, and reacted with diazo salts produced outside of the motor fuels, or as noted above, the diazo salts may also be produced in the motor fuels, or a portion thereof for reaction with the Grignard reagents. Or, as explained below, the diazo compounds may be produced from the motor fuel constituents themselves and reacted with Grignard reagents from external sources.

The production of various amines and their derivatives, such as the hydroxyl amines have been given above derivable from the Grignard types of reagents. Various other methods for producing the amines and their derivatives in the motor fuels from constituents thereof may be utilized, as set forth in Patent No. 2,272,134.

Once the amines have been produced in the motor fuel, or are present therein, and they may, of course, be added from extraneous sources for this purpose, but desirably they are produced in complex mixture in the motor fuels themselves by any of the methods set forth above, they lend themselves to a wide variety of treatments for the production of various types of derivatives of great importance in the motor fuels, since they may be readily converted into anti-gum components, dyes, etc.

One of the most important methods for deriving desirable components therefrom is by treatment with nitrous acid or its salts and esters. Under such treatments the aliphatic amines in the fuel are converted into alcohols, which are, of themselves, important components of the motor fuel mixtures for various purposes, while the aromatic and cyclic amines are converted into diazo derivatives, which lend themselves to various treatments, such as reduction, coupling, etc.

Various methods for producing such diazonium derivatives and alcohols by the utilization of nitrous acid, its salts and esters are, of course, available. While diazotization is usually carried out at low temperatures in aqueous solution, it is not necessary that aqueous solutions be employed, although they can be applied in manners analogous to that set forth above for other reactions involving the use of aqueous solutions. For example, the motor fuel containing the aminized derivatives may be agitated with the nitrous acid solution, whether produced from the salts or from the esters, so that the aqueous phase is in continuous contact with the hydrocarbon phase. And conversion of the amino derivatives is accordingly accomplished. In order to avoid loss of desirable products into the water phase, however, the reactions are desirably carried out in non-aqueous media. The presence of the alcohols formed by the action of the nitrous acid on the aliphatic amines is important in such reactions, since such alcohols act as a satisfactory medium in which the diazotization may be carried out.

Thus absolute alcohol may be saturated with nitrous fumes, and the saturated alcohol then added to the aminized motor fuel with the resulting production of diazo compounds. Other methods include the addition of absolute alcohol or ether, if desired, but they are not essential to the aminized motor fuel, and then passing dry hydrogen chloride into such solution, heating to 40 or 50° until the last traces of acid are removed. The theoretical quantity of amylnitrite is then added, and this can even be done at ordinary temperatures, although lower temperatures are usually preferable in the production of diazo compounds, particularly where wide varieties of such diazo compounds are formed as is true in the treatment of aminized motor fuels, some of the diazo compounds only being stable at lower temperatures, as around 0°. The diazo compounds are thus formed in the motor fuel fraction from components thereof.

It should be kept in mind, as pointed out above in connection with other types of compounds and methods, that it is not necessary to treat the entire fraction of gasoline in this manner, but only a portion thereof may be subjected to such reactions, and after the production of the diazo compounds, such fractions added to the remaining portion of the motor fuel. Or the diazo compounds may be produced in concentrated condition, and then diluted with the motor fuel constituents to produce the final fuel. The diazo compounds, while sometimes insoluble, will usually be found to be present in solution because of the complex derivatives obtained from the treatment of the motor fuels themselves, in which the various ingredients flux each other, and produce a homogeneous composition. But where minor quantities of the diazo compounds in high dilution are utilized, the suspension of such diazo compounds in the motor fuel components also produce compositions that may be utilized directly.

Nitrosyl bromide and nitrosyl chloride, as well as nitro sulphonic acid may also be employed for the production of the diazo compounds. Thus the aminized motor fuel, either with or without alcohols present, or introduced for that purpose, has added thereto an alcoholic solution of hydrogen chloride containing 2.5–3.0 mols of acid as compared with the amines present. The composition is cooled in ice, and a solution of nitroso chloride, for example, in toluene added. The diazo salt is thus produced.

The diazo salts may also be produced from the nitroso aryl hydrazine referred to above by passing nitrous fumes into the solution of the nitroso aryl hydrazine. Quinone oxime present in the motor fuel by methods of production that will follow from reactions given above, or introduced into the motor fuel for that particular purpose may be treated with nitrogen trioxide, preferably in ethereal solution to yield corresponding diazo salts. Also by the action of chlorine or bromine on the phenyl hydrazine derivatives produced in any of the methods set forth above will result in the production of diazo salts.

The reactions referred to above have particularly emphasized the production of the diazo salts and compounds of the aromatic and cyclic type, whereas examples of producing the diazo paraffins have also been given at an earlier portion of this specification. The hydrazines may also be utilized for producing diazo paraffins. Thus alkyl hydrazines produced in the motor fuel by any of the methods set forth above on treatment with potassium pyrosulphate, followed by oxidation of the resulting compound with mercuric oxide yields diazo compounds. Thus ethyl hydrazine treated with potassium hydrosulphate gives potassium ethyl hydrazine sulphonate, $$C_2H_5NH-NHSO_3K$$

which on treatment with the mercuric oxide is converted into potassium diazo ethyl sulphonate $C_2H_5N=N.SO_3K$.

The importance of the diazo compounds is readily recognized because of their various reactivities to produce different types of derivatives of great importance in the modified motor fuels. Their reduction to produce hydrazines has already been indicated above, and such hydrazines are readily methylated or alkylated as by the treatment with methyl iodide to produce alkyl hydrazine. The reduction of the diazonium salts to the hydrazines may, for example, be carried out by treatment with stannous chloride and hydrochloric acid, the aqueous phase being agitated with the hydrocarbon phase containing the diazo salts until the desired reduction is produced.

To briefly indicate some of the other important reactions of the diazo compounds, the following may be noted. If a motor fuel containing the diazo compounds are heated with absolute alcohol, they yield hydrocarbons and aldehydes. Thus phenyl diazonium chloride heated with absolute alcohol yields benzene on the one hand, and acetaldehyde on the other in accordance with the following equation:

$$C_6H_5N=NCl+C_2H_5OH= C_6H_5+N_2+HCl+CH_3CHO$$

And by such reactions aldehydes may be readily produced in the motor fuel. If the motor fuel containing the diazo compounds are warmed and agitated with an aqueous solution, they yield phenols. Similarly warmed with halogen acids, halogen derivatives are obtained. Phenyl diazonium sulphate thus warmed with hydriodic acid yielding iodobenzene, nitrogen and acids. The various cuprous salts may be utilized in accordance with the Sandmeyer reaction to produce corresponding derivatives. Thus cuprous cyanide yields phenyl nitrile $C_6H_5CN$, and the nitriles, of course, upon reduction may be readily converted into amines. It is not intended by these reactions to indicate that specific individual compounds are being treated, but these reactions exemplify the complex derivatives that are producible in the motor fuels by these various treatments of the diazo compounds, complex mixtures of such derivatives, of course, being obtained by these treatments, since the motor fuel contains various diazo derivatives of complex character. The diazo compounds treated with hydroxyl amine result in amines.

It may be noted that the aryl hydrazines when treated with nitrous acid yield nitrosyl derivatives, and the latter upon agitation with water are converted into azide derivatives. Such reactions may be carried out by agitating the hydrocarbon fraction containing the phenylhydrazine with the aqueous medium containing the nitrous acid, the process proceeding in accordance with the following reaction:

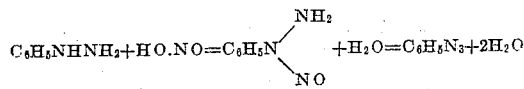

However, it may be noted that where the aryl hydrazines are present in the same composition with the aryl diazonium salts, the aryl azides will be produced by reaction between such components, one such reaction being formulated as exemplary between phenyl hydrazine and phenyl diazonium sulfate, as follows:

$C_6H_5N_2SO_4H + C_6H_5NHNH_2 =$
$\qquad C_6H_5N_3 + C_6H_5NH_2H_2SO_4$

Thus the azides may be derived through the diazonium compounds, and the hydrazines, as well as through the Grignard reagents, as stated earlier.

Other types of anti-gumming derivatives, such as anthraquinone, are readily produced in the motor fuels containing aromatics by the addition of phthalic anhydride and aluminum chloride, the phthalic anhydride reacting with the benzol, for example, to give anthraquinone, while higher derivatives are produced from other homologues.

The various processes outlined above may be carried out by utilizing the reacting ingredients in their theoretical molecular equivalent proportions in accordance with the equations for the reactions illustrated. Such molecular equivalent proportions being based on the content of the ingredient of the motor fuel which is to be utilized. Thus where chlorhydrocarbons are being reacted, the reactions may be based on the use of the fraction containing the chlorhydrocarbons, utilizing an amount of such fraction which will yield the molecularly equivalent amount of chlorine. Similar considerations will apply to other reactions involving the amines, etc., etc.

The presence of various derivatives of the diazo and amino types produced in the motor fuel fractions is set forth above, and other derivatives, such as the phenols, etc., lend such fractions desirably to the production of dyes in the motor fuels themselves.

Thus amino-azo compounds may be produced by reaction of the diazonium salts with aromatic amines and their derivatives, phenyl diazonium chloride yielding, for example with dimethylaniline, dimethylaniline azobenzene in accordance with the following formulation:

$C_6H_5N_2Cl + C_6H_5.N(CH_3)_2 =$
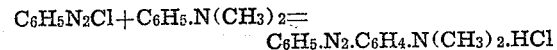

Thus, the Grignard reagents may be utilized for the production of diazo compounds, both of the aliphatic and aromatic series, and such diazo derivatives are important components in the motor fuels, whether or not they contain metallic derivatives, both varieties of which will be illustrated below, namely those containing metallo components, and those free from them. Diazo components are valuable in the motor fuels from two standpoints. Both because they have properties as anti-gum derivatives, and also because they increase the power obtained from motor fuels. The contents of such diazo compounds in motor fuel may be very low, not running more than 1% in any event, and substantially smaller proportions, as low as .1% in the motor fuels giving markedly increased and valuable properties thereto. For example, derivatives of the diazo amino paraffins are readily prepared, for which purpose the alkyl Grignard reagents may be reacted with the alkyl azides, of which the following reaction is exemplary:

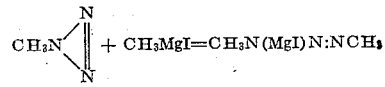

And as a result of which reaction there is produced compounds corresponding with the magnesium salt of diazo amino methane. In the application of such reactions herein, there will usually be produced complex derivatives of such components. The magnesium derivative produced in accordance with the preceding method, may be permitted to remain in the motor fuel itself, or may be treated as a Grignard for other reactions, such as those to which the Grignards are capable, particularly as emphasized above. Thus various metallo derivatives may be produced, such as the copper compound:

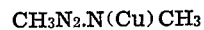

or other metallic derivatives, such as those of lead, etc., may similarly be produced and utilized in the motor fuel, both because of the lead component, and also because of the diazo grouping present. While the alkyl derivatives have been particularly referred to, diazo aryl derivatives may be produced in an analogous way, and particularly diazo amino paraffins, and diazo amino aryls.

This is exemplary of a wide variety of amino-azo compounds that can thus be produced directly in the motor fuel. Of course, individual compounds are thus not generally produced, since the diazonium compounds present in the motor fuel by reactions as set forth above will be complex mixtures of such derivatives, and the result will be a heterogeneous mixture of derivatives; but the fluxing action of such derivatives with each other enables a homogeneous composition to be produced since only small portions of the dye need be necessarily present in any event to give the gasoline the desired color. Such derivatives may be produced by preparing the diazo compounds in the motor fuels themselves from constituents thereof, and adding the amines to react therewith from extraneous sources, or the aromatic amines may be produced in the motor fuel, and the diazo salts produced extraneously thereof, or both sets of compounds may be produced directly in the motor fuel from components thereof, and the dye developed in situ in the motor fuel.

In a strictly analogous manner, the diazo compounds may be coupled with phenols, amino phenols, etc., amino sulphonic acids and other derivatives usually coupled with such derivatives to produce amino azo compounds, or their derivatives.

Of course, such amino-azo derivatives may be further diazotized in the motor fuel, and coupled with further components to produce disazo dyes. As exemplary thereof, the following may be noted. A motor fuel fraction containing alpha-naphthyl-amine is coupled with diazotized para-anisidine using approximately a fraction of the motor fuel containing 30 parts of alpha-naphthylamine with approximately 25 parts of the diazotized compound. The resulting amino-azo derivative in the motor fuel is further diazotized by agitation with an aqueous medium containing 11 parts of hydrochloric acid and 15 parts of sodium nitrite for 1 hour at 10° C. The aqueous phase is separated, and approximately 30 parts of beta-naphthol are added to the motor fuel fraction containing the diazo compounds, and coupling takes place. If desired, however, to accelerate the coupling, the fraction containing the beta-naphthol and the diazo derivative may be agitated with an aqueous medium containing approximately 9 parts of caustic soda, and approximately 20 parts of sodium carbonate in water, the temperature being maintained at about 5° C. A bluish red dye is thus produced in solution in the gasoline fraction, directly therein, at least in part produced from components of the motor fuel itself. Since the naphthylamine may be produced with the motor fuel itself, the beta-naphthol may be produced in another portion of the motor fuel by reactions indicated above, and even the para-anisidine may be produced from a fraction of treated motor fuel by processes indicated above. Various derivatives of this type may be produced, so that a wide variety of disazo dyes may thus be produced directly in the motor fuel itself from its components.

Or again, ortho-anisidine may be diazotized and coupled with beta-naphthol to produce ortho-anisidine-azo-beta-naphthol as a dye coloring the gasoline, and produced directly in the motor fuel by processes that will follow from those given above.

Dyes of the indophenol and indamine type may be readily produced in the motor fuel from components therein. The production of various amines and phenol derivatives from components of the motor fuels has been given above. Where the aromatic amines are present in the motor fuel, it may be subjected to oxidation to produce the indamines therein, or phenols may first be added to produce the indophenol derivatives on oxidation, or where phenols are present, amines may be added from an extraneous source, or different fractions of the motor fuels may be treated to produce amines in one fraction and phenols in the other, and such fractions then mixed and subjected to oxidation to produce the desired indophenol or indamine, as the case may be. Thus for motor fuel fractions containing para-amido-dimethyl aniline and alpha-naphthol, or nitrosodimethylaniline and alpha-naphthol upon oxidation an indophenol is obtained. The reactions may proceed at room temperatures, but elevated temperatures may be employed, as for example, above 100° F. in which event the reactions are desirably carried out under pressure in order to avoid loss of desirable lighter constituents from the motor fuel. An this observation, of course, applies to the various reactions hereinabove set forth where the elevated temperatures are employed, and wherein pressures are desirably maintained in order to avoid loss of desirable constituents in the motor fuel.

The phthalein dyes may be prepared, for example, from motor fuel fractions containing phenol desirably produced from constituents of the motor fuel in situ by methods set forth above, by condensation with phthalic anhydride, phenol itself thus yielding phenol phthalein. Other phthalein derivatives may be prepared in an analogous manner.

The anthraquinone types of dyes are particularly important in the motor fuels, and may be readily produced therein from components of the motor fuel itself. The production of anthraquinone derivatives in the motor fuel has been illustrated above produced from components of the motor fuel itself. Such anthraquinone derivatives may be nitrated, and subsequently reduced, utilizing the nitration and reduction reactions illustrated above to produce amino-anthraquinones which may then be coupled with the desirable ingredients, such as diazotized para-amino-toluene. In this way, for example, 1-methylamino-4-para-tolyl amino-anthraquinone may be produced yielding a blue dye coloring the gasoline blue.

The acridine dyestuffs may similarly be produced in the motor fuel in situ from components of the motor fuel itself. For example, the aryl amines produced in the motor fuel may be condensed with benzaldehyde from an extraneous source, or the benzaldehyde may be produced in the motor fuel from constituents thereof, and the aryl amines introduced for the condensation reaction, followed by treatment with hydrochloric acid to split off ammonia, and oxidation to produce the dye base.

Various other types of dyes may, of course, be produced by analogous reactions. It should also be kept in mind that many of the dyes, and particularly the complex amino and phenolic compounds are in themselves anti-gumming agents, so that they have double properties in the motor fuel in producing not only a colored motor fuel, but also tend to prevent the formation of gums.

The dyes utilized in such hydrocarbon fractions or distillates and whether produced in situ particularly from components of the hydrocarbon fractions themselves, or produced externally of the hydrocarbon fraction and added thereto, may desirably be metallized and thus converted into metal containing compounds which serve a dual function. Thus if the metal employed is an anti-knock metal as hereinabove set forth and the metallized dye is present in a motor fuel, the dye will serve both to color the fuel and to provide anti-knock properties. The same is true in connection with such metallized dyes used in lubricating oil fractions, but here the metal may be other heavy metals which form derivatives with the dye compound and exhibit their adjuvant properties in such lubricating oils. For the latter purpose the metals may include the alkaline earths and generally the metals of groups II, III, IV, V and VI of the periodic system as well as iron, cobalt and nickel; but alkali metal compounds are not excluded. Where several metallizing groups are present, mixed metal derivatives may be produced in, for example, motor fuels and lubricating oils to exhibit combined adjuvant properties.

A metallizable group should be present in the dye compound, such groups including OH, COOH, SO₃H, etc., and the presence of hydroxy and carboxy groups in the molecule ortho to the azo group in azo dyes, is particularly important.

While the dye compounds need not necessarily be soluble in the hydrocarbon fraction, they generally will be soluble at least when produced in situ because of their mixed character. Solubilizing groups may be introduced for this purpose including long alkyl chains of both straight chain and branching chain type.

The following examples will illustrate some of these features. Assuming a motor fuel containing an azo dye of the following formula:

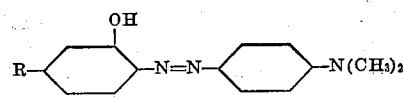

produced in situ by methods set forth above or added to the motor fuel from an extraneous source, the metal derivatives such as lead, mercury or tin compounds may be formed by agitating the motor fuel with an aqueous solution of the corresponding metal salt such as lead acetate or mercury chloride or tin chloride, desirably in the presence of an acid such as hydrochloric or acetic acid and moderately heating, as for example, to 80 or 90° C., pressure being used to prevent undue loss of the volatile constituents. Assuming a dye of the structure set forth above, 100 parts of the motor fuel containing 1 part of such dye may be treated with 1½ parts of lead acetate or 1¼ parts of mercury chloride or 1 part of tin chloride in acid solution with agitation to produce the corresponding derivatives. The layers are permitted to stratify and the hydrocarbon layer carrying the metallized dye derivative is withdrawn, washed if necessary and dried.

Similarly, metal derivatives of the other types of dyes set forth above containing a metallizable group may be produced by analogous methods. Thus an indophenol may be produced in situ in the lubricating oil, for example, by methods set forth above. As a specific example, the indophenol produced from nitroso dimethylaniline and phenol may be present in the lubricating oil produced in situ therein by methods set forth above to form the nitroso dimethylaniline and the phenol which upon oxidation are converted to the indophenol of the following formula in its reduced state:

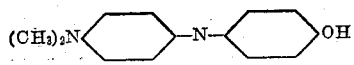

Or the indophenol may be produced externally of the fraction and incorporated therein. In this as in other cases where solubility of the dye in the hydrocarbon fraction is not sufficient blending agents or solubilizing groups may be present. The corresponding metal compound is obtained by agitating the fraction with, for example, a lead acetate solution containing acetic acid in the proportions of 1 part of dye to 1½ parts of lead acetate. The treatment may be carried out with warming as set forth above, and agitation over a period of several hours. The hydrocarbon fraction is then separated, washed and dried.

By the methods set forth above, dye compounds may be produced while include a metal having additional adjuvant properties so that a single type of compound may thus exhibit a multiplicity of properties, as for example, coloring and anti-knock properties, etc.

While various individual processes and methods of producing particular types of compounds have been set forth above, combinations of those various methods may be employed to produce double substitutions and various derivatives of organic character. For example, instead of chlorinating or halogenating the motor fuel fraction, the motor fuel fraction may be aminized by the various methods referred to above, and then halogenated to produce chloramino derivatives in the motor fuel of both alkyl and aryl character, and such chloramino derivatives may thereupon be utilized for any of the reactions set forth above, including conversion into metallo organic derivatives having amino compounds bound in the molecule containing the metallo ingredient, or the Grignard reagents may be produced from the halogen-amino derivatives, for example, and such Grignard reagents reacted in accordance with the methods set forth above, so that various combinations of the several processes set forth herein may be utilized. And as indicated in connection with several individual methods set forth above, one portion of the motor fuel may be subjected to one type of treatment for the production of a particular class of derivatives, while another portion is subjected to a different treatment, and the two fractions then combined to have present both types of derivatives, or successive operations of these methods may be carried out to produce both type of derivatives. Of course, it must be kept in mind that not only are complex mixtures of derivatives produced in all of these instances where the types of reaction products are produced in the motor fuels themselves, and that where exemplary reactions are given, they are merely exemplary of the type of compounds being produced, since a number of derivatives in that class or type of compound will be produced by these reactions when carried out in situ, but complex combinations will take place between various ingredients of the motor fuels themselves, where different organic derivatives are present.

Furthermore, while the methods set forth above have been particularly illustrated in connection with their application to motor fuel fractions, those methods may be applied to petroleum oils or distillates or fractions therefrom, whether cracked or uncracked, before the distillation or preparation of the motor fuel fractions themselves, so that advantage may be taken of the subsequent steps utilized in the production of the motor fuels themselves to complete the processes of producing particular classes of compounds, as set forth herein. This may be illustrated in a number of ways. A number of the methods set forth above require the application of heat to complete the reactions. Such compounds as require heat to complete the reactions, particularly where elevated temperatures are employed, and the hydrocarbon materials undergoing treatment are, therefore, desirably treated under pressure, these methods may be carried out by taking the hydrocarbon materials before distillation or other heat treatment to produce the motor fuel fractions, and incorporating the necessary reactants to produce the classes of compounds desired, so that upon the distillation or heat treatment to produce the motor fuel itself, the methods are carried out for producing simultaneously the classes of compounds resulting from the reactions set forth. Similarly, a number of reactions as set forth above utilize reduction processes. In view of the wide use of hydrogenation methods in the production of motor fuels today, as well as lubricants, etc., the reduction reactions may take place at the same time that the hydrogenation treatment is utilized for producing the hydrogenated motor fuels. For example, the ingredients necessary to produce the desired classes of compounds upon reduction may be present in the hydrocarbon material before the hydrogenation treatment applied to the motor fuel, so that upon completion of the hydrogenation treatment, the reduction of the compounds present may be simultaneously carried out, the hydrogenated motor fuel derivatives being produced at the same time that the classes of compounds for anti-gum or other purposes are being produced in the motor fuel. Similarly, where refining treatments are employed, involving treatments with caustic soda or sulfuric acid or successive treatments of that character, and where, for example, an acid treatment is necessary in connection with the production of particular types of compounds in accordance with the methods set forth above, the ingredients necessary to produce the desired derivatives upon treatment of sulfuric acid may be introduced into the hydrocarbon materials before the application of the sulfuric acid treatment, for example, so that the refining with sulfuric acid is carried out simultaneously with the treatment with acid necessary to produce anti-gum or other types of derivatives. These several examples will illustrate the application of ordinary refining methods as they are carried out at the present time in the plant, and their utilization in producing particular types of derivatives in the modified motor fuels in accordance with the present methods, so that a single reaction of that character is sufficient to accomplish both ends.

While the invention has been particularly illustrated with motor fuel fractions such as gasoline, other hydrocarbon fractions and distillates may be similarly treated. For example, components, fractions or distillates of the character known as lubricating oils and generally any of the hydrocarbon fractions and distillates produced from petroleum derivatives having boiling points substantially higher than the motor fuel ranges, may be treated by any of the methods set forth above so that such modified lubricating oils or other hydrocarbon fractions or distillates may be modified in accordance with the various methods set forth above to produce new types of products containing the desired derivatives either produced outside of such lubricating oil or other hydrocarbon fraction or distillate and subsequently added thereto, or more desirably produced in stiu by the methods set forth above in such lubricating oils or other hydrocarbon fractions or distillates.

The term "indigenous" is used herein to refer to components present in the distillate whether fuel or lubricant which are constituents of such distillate as normally manufactured, and to distinguish from components added to the distillate from extraneous sources for special purposes.

Having thus set forth my invention, I claim:

1. A liquid petroleum distillate containing as a beneficiating agent, from .05 to 5% by weight of a sulphazide having the formula $R.NH.NHSO_2R'$, where R and R' are selected from the group consisting of alkyl and aryl radicals.

2. A composition as set forth in claim 1, in which the distillate is a hydrocarbon motor fuel.

3. A composition as set forth in claim 1, in which R and R' are aryl groups.

4. A composition as set forth in claim 1, in which R is aryl and R' is alkyl.

5. A composition as set forth in claim 1, in which R and R' are aryl and at least one of the aryl groups contains a substituent alkyl group of at least 3 carbon atoms.

6. A liquid petroleum distillate containing as a beneficiating agent, from .05 to 5% by weight of an azide having the formula $R.NH.NH.(Q_xT_y)R'$, where R and R' are selected from the group consisting of alkyl and aryl radicals and $Q_xT_y$ represents a residue selected from the group consisting of $—SO_2—$, $—SO—$, $—SOS—$, $—SS—$, $—SSS—$.

7. A composition as set forth in claim 6, in which the distillate is a hydrocarbon motor fuel.

8. A composition as set forth in claim 6, in which R and R' are aryl groups.

9. A composition as set forth in claim 6, in which R is aryl and R' is alkyl.

10. A composition as set forth in claim 6, in which $Q_xT_y$ is $—S—S—$.

11. A composition as set forth in claim 6, in which $Q_xT_y$ is $—S—S—S—$.

12. The method of producing modified petroleum distillates which comprises treating a petroleum distillate to produce a diazo salt therein and converting said diazo salt in situ to an azide having the formula $R.NH.NH.(Q_xT_y)R'$, where R and R' are selected from the group consisting of alkyl and aryl radicals and $Q_xT_y$ represents a residue selected from the group consisting of $$—SO—, —SOS—, —SS—, —SSS—$$

13. A composition as set forth in claim 1, in which the distillate is a hydrocarbon lubricant.

14. The method which comprises diazotizing a diazotizable amine contained in a petroleum distillate to produce a diazo salt therein and converting said diazo salt by treatment with sulfur dioxide in situ at a temperature below that of decomposition of the diazo salt to a sulphazide having the formula $R.NH.NHSO_2R'$ where R and R' are selected from the group consisting of alkyl and aryl radicals.

15. The method which comprises diazotizing diazotizable indigenous amines contained in a petroleum distillate to produce indigenous diazo salts therein and converting said diazo salts by treatment with sulfur dioxide in situ at a temperature below that of decomposition of the diazo salts to sulphazides at least in part.

SOL SHAPPIRIO.

REFERENCES CITED

The following references are of record in the file of this patent:

Berichte der Deutschen Chemischen Gesellschaft, by Konigs; vol. 10, p. 1531.

Journal for Practische Chemie (2), vol. 56, p. 219.

Berichte der Deutschen Chemischen Gesellschaft, by Heffter; vol. 28, p. 2260.